Patented Dec. 4, 1951

2,576,955

UNITED STATES PATENT OFFICE 2,576,955

LOW-WATER-LOSS CEMENT

Norman C. Ludwig, Chicago, Ill., assignor to Universal Atlas Cement Company, a corporation of Indiana No Drawing. Application October 18, 1946, Serial No. 704,295

8 Claims. (Cl. 260—29.6)

This application is a continuation-in-part of application Serial No. 656,154, filed March 21, 1946 and now abandoned.

This invention relates to low-water-loss cement, low-water-loss cement slurries, and methods of making such slurries. By low-water-loss cement is meant a cement which shows low loss of water from the slurry before stiffening occurs.

The invention has among its objects the provision of a low-water-loss cement, a slurry made of such cement, and the method of making the slurry, the cement being of such character that it is effective to prevent undue loss of water therefrom, such as occurs in ordinary cements, particularly when subjected to pressure in contact with porous media.

A further object of the invention resides in the provision of a low-water-loss cement of the above character which produces structures having high compressive strength within a reasonably short time.

These and further objects of the invention will become more readily apparent in the following description of the invention.

The cement with which the present invention is concerned has been found most useful for sealing and solidifying underground structures, such as porous or broken formations, an operation which is necessary, for instance, in the preparation and maintenance of a deep well in the earth, such as an oil well. Such operation is known as "squeeze cementing." Although the cement of the invention will be discussed primarily for such use, it is to be understood that it may be used to advantage in other applications where high fluidity of the slurry, particularly when it is subjected to elevated pressures in contact with porous structures, is desired.

It is frequently necessary in preparing an oil well for production to solidify the underground formations adjacent the well at predetermined depths to seal oil bearing formations against the entrance of water or gas. Such sealing is effected by forcing cement slurries down the central tubing or hollow drill rod of the well and out through holes in the sides of the well casing which have been formed at the desired depth. The slurry is forced by the application of pressure into the porous formations surrounding the openings in the well casing, the formations thus being made, in effect, monolithic to form an effective barrier to encroachment of water or gas at such location. Difficulties have been experienced in the use of known oil well cements for such squeeze cementing operation, since when forced against a porous medium, which may have very small openings therethrough approaching capillary size, they lose water very rapidly, and as a result, they quickly lose fluidity. Thus, a filter cake is soon built up at the entrance of the openings of small size in the broken formation so that the formation remains porous and unsealed in numerous places. It has been recognized that it would be desirable to provide a cement for such operation which will remain fluid, despite the application of pressure, when it is forced against porous formations, in order that the smaller as well as the larger openings of the formations may be sealed. See, for example, the patent to Proctor, No. 2,233,872, dated March 4, 1941, wherein the problem is discussed.

My improved cement differs from those previously used in attempts effectively to seal such porous formations in that it has a very low water loss under pressure and that its composition is such that within a reasonable time, say 24 hours, it yields a structure having a high compressive strength. The cement may be used with retarders giving it a delayed stiffening time, as is usually necessary in the application of the slurry to deep well structures.

Briefly, the cement of the present invention consists of a hydraulic cement, preferably a Portland or Portland-type cement, with the addition to the dry cement or to the slurry thereof, of polyvinyl alcohol (PVA), in an amount of from 0.025 to 5.00% by weight of the cement. It is usually desired, for reasons of efficiency and economy, when one only of types A and B polyvinyl alcohol (defined below) is employed in the cement or slurry, to add it within the ranges of from 0.025 to 1.00% by weight of the cement, and preferably from 0.10 to 1.00%. Where it is desired to produce a slurry with good water retention properties over the entire temperature range of from 70 to 200° F., however, it is preferred to add a mixture of types A and B polyvinyl alcohol, in an amount from 0.85 to 2.75% by weight of the cement. For optimum results, the above mixture comprises type A polyvinyl alcohol in an amount from 0.10 to 0.50% by weight of the cement, and type B polyvinyl alcohol in an amount from 0.75 to 2.25%. The addition of polyvinyl alcohol does not adversely affect ordinary retarders nor vice versa. Such retarders are accordingly included in my improved cement in the amounts ordinarily used. Typical of such retarders is modified starch, which is employed to retard the stiffening and setting time of the slurries at temperatures of from 100° to 200° F. and higher. By "modified starch" is meant a processed starch that may be classified by any of the following technical or trade names:

Thin boiling starches.
Oxidized starches.
Dextrine—low and medium soluble.
British gums—low and medium soluble.
British alkali gum—low and medium soluble.

Such modified starches may be used in the slurry described above, within the range of from .10 to .50% by weight of the cement.

Another retarder which may likewise be used is casein, which may be added as a dry powder to the dry cement or to a slurry, within the range of from .20 to 1.00%. A further retarder which may be employed is one disclosed in the patent to Weiler Patent No. 2,006,426, dated July 2, 1935, which is a combination of water soluble boron compounds with water soluble gum, the boron compounds composing from 25 to 95% and the gum composing from 5 to 75% by weight of the retarder, typified by the following compositions:

1

| | | |
|---|---|---|
| Boric acid | per cent | 60 |
| Borax | do | 30 |
| Gum arabic | do | 10 |

2

| | | |
|---|---|---|
| Boric acid | per cent | 30 |
| Borax | do | 35 |
| Gum | do | 35 |

These retarders when employed in amounts from .30 to 1.00% by weight of the cement with slurries of Portland or Portland-type cement containing polyvinyl alcohol in the amounts above set out, give the resulting mixture a retarded stiffening and set combined with low water loss.

The results of tests for water loss under pressure at different temperatures and compressive strength after 24 hours conducted on specimens of cement slurries containing polyvinyl alcohol in amounts stated, given in Table I below, indicate that the water loss of such slurries is so small that fluidity is retained throughout an extended period even at elevated temperatures while under pressure and in contact with a porous medium.

In the tests, set out below in Tables I to V, inclusive, the cement employed was one falling within the A. S. T. M. designation C-150-44, type III, which is a high early strength Portland cement. Specifically, the cement employed was Portland high early strength having an oxide analysis in per cent as follows:

Oxide analysis, per cent

| $SiO_2$ | $Al_2O_3$ | $Fe_2O_3$ | CaO | MgO | MnO | $SO_3$ | Loss on Ignition | Total |
|---|---|---|---|---|---|---|---|---|
| 21.2 | 5.9 | 2.5 | 64.9 | 1.1 | 0.18 | 2.3 | 1.2 | 99.28 |

The cement employed had a specific surface of 2695 cm.$^2$/g., as measured by the Wagner turbidimeter in accordance with A. S. T. M. designation C-115-42. It is to be understood, however, that other Portland and Portland-type cements may be used, if desired.

In the water retention tests, the results of which are reported in ml. water loss in minutes and seconds, the test was carried out by bringing the slurry of the cement with the indicated amounts of water and PVA to the indicated temperature, and by subjecting it to 100 lbs. per sq. in. pressure in a pressure filter of the type marketed as a Baroid wall-building tester. The test method employed was similar to that specified by the American Petroleum Institute for testing drill muds and involved the use of a sheet of Whatman No. 50 filter paper at the bottom of the filter. A description of such wall-building tester and its use in testing of drill mud is found on pages 4 and 5 of the publication "Drilling Mud," May 1940, published by Baroid sales division, National Lead Company. To determine the water loss at elevated temperatures, the cement slurry was prepared by mixing in a metal cell placed in a heating bath and the pressure filter was preheated to the indicated temperature, the slurry was poured into the filter, and the filter and slurry were maintained at such temperature by suitable heating coils or water jacket surrounding it. The compressive strength of each specimen reported in the tables was determined by making two-inch cubes of such slurries, allowing them to hydrate for 24 hours at the indicated temperature, and testing them to destruction on a compression testing machine.

The polyvinyl alcohol employed in all the tests set out in Tables I to VIII, inclusive, below was added as a dry powder to the dry cement and thoroughly mixed therewith before the addition of the water to form the slurry. It will be understood, however, that it could just as well be added in water solution to the cement or slurry.

The type of polyvinyl alcohol employed in each test is noted in the tables. Polyvinyl alcohol, which is obtained by the hydrolysis of polymerized vinyl acetate, is designated either type A or type B by the manufacturer, E. I. du Pont de Nemours Company, depending upon the degree of such hydrolysis. Type A polyvinyl alcohol, which is readily soluble in cold water, is manufactured at present in grades representing, respectively, 50, 77, and 88% total hydrolysis. Type B polyvinyl alcohol, which is sparingly soluble in cold water but readily soluble in hot water, is obtained from the practically total (99%) hydrolysis of polymerized vinyl acetate.

I have found that type A polyvinyl alcohol is most effective as a water retention agent for cement slurries at low temperatures, such as from 70 to 140° F., and that type B polyvinyl alcohol is most effective as a water retention agent at temperatures above 140° F., expecially between 160 and 200° F. I have further found, as will be apparent from the test results set out in Tables VI, VII, and VIII, that by combining the two types of polyvinyl alcohol, with the total polyvinyl alcohol content lying within the above given broad limits, that is, from 0.025 to 5.00% by weight of the cement, and preferably between 1.00 and 2.25%, on the same basis, desirable water retention properties of the cement slurry can be obtained over the entire temperature range of from room temperature (70° F.) to 200° F.

In cement slurries, especially when the slurries are mixed rapidly and consequently with high agitation, polyvinyl alcohol acts as a foam stabilizing agent and causes the entrainment of a considerable amount of air. In the usual methods of preparing slurries for use in oil wells, therefore, the addition of polyvinyl alcohol causes foaming and frothing of the slurry, which is generally considered undesirable in oil well cementing operations. Such foaming and frothing of the slurry containing polyvinyl alcohol can be nullified by the use of defoaming agents such as tributyl phosphate and pine oil. Such defoaming agents, when used, are added in small amounts, from 0.02 to 0.05% tributyl phosphate being typical, sufficient to suppress the foaming and frothing tendencies of polyvinyl alcohol on the slurry under the particular slurry mixing and pumping conditions employed.

Table I gives the results of tests carried out on neat cement slurries which are typical of those used for oil well squeeze cementing. The water retention and compressive strength of slurries resulting from the addition of varied amounts of polyvinyl alcohol, tests 2 to 11, inclusive, being compared with such properties of a similar cement slurry without polyvinyl alcohol. In each of the specimen slurries containing polyvinyl alcohol in each of Tables I to VIII, inclusive, below from 0.02 to 0.05% tributyl phosphate was added as a defoamer.

are set out the results as to water loss and stiffening time of cement slurries containing 60 parts of water to 100 parts of cement by weight, together with modified starch, casein, and the first recited preferred retarding composition set out in the above Weiler patent, that is, 60 parts boric acid, 30 parts borax, and 10 parts gum arabic, was employed. Such mixture is hereinafter called "Weiler composition." The water loss and compressive strengths of the specimens were determined as heretofore described. The stiffening time of the slurry was determined by use of an apparatus such as shown in Weiler Patent No. 2,122,765, dated July 5, 1938, which is known as the "Halliburton Consistometer," and is de-

TABLE I

*Water loss and compressive strength of cements containing PVA*

| | Water, Parts per 100 Parts Cement, by Weight | PVA, Per Cent Weight of Cement | Water Loss at Temperatures Indicated | | | | | | Comp. Stg. in 24 Hr. at 140° F. |
|---|---|---|---|---|---|---|---|---|---|
| | | | 70°–80° F. | | | 130°–140° F. | | | |
| | | | Ml. | Min. | Sec. | Ml. | Min. | Sec. | |
| | | | | | | | | | P. s. i. |
| 1 | 60 | None | 184 | 2 | 10 | 162 | 1 | 7 | 3,908 |
| 2 | 60 | 0.025 Type A | 152 | 15 | 0 | 156 | 1 | 22 | 3,588 |
| 3 | 60 | 0.05 Type A | 69 | 30 | 0 | 143 | 1 | 32 | 3,823 |
| 4 | 60 | 0.10 Type A | 35 | 30 | 0 | 155 | 3 | 14 | 4,067 |
| 5 | 60 | 0.15 Type A | 27 | 30 | 0 | 105 | 30 | 0 | 3,850 |
| 6 | 60 | 0.20 Type A | 23 | 30 | 0 | 74 | 30 | 0 | 3,875 |
| 7 | 60 | 0.25 Type A | 25 | 30 | 0 | 60.5 | 30 | 0 | 3,594 |
| 8 | 60 | 0.50 Type A | 13.5 | 30 | 0 | 38 | 30 | 0 | 3,682 |
| 9 | 60 | 1.00 Type A | 11 | 30 | 0 | 15.5 | 30 | 0 | 3,733 |
| 10 | 60 | 1.00 Type B | 60.5 | 30 | 0 | 130.5 | 30 | 0 | 3,645 |
| 11 | 60 | 5.00 Type A | 2 | 30 | 0 | 3 | 30 | 0 | 3,318 |

It will be seen from the above table that the water loss in the slurry of test 1 was high both at room and elevated temperatures. The addition of from 0.025 to 5.0% polyvinyl alcohol, test 2 to 11, inclusive, to such neat slurry decreases the water loss at room temperature to a remarkable degree, the effect being even more marked when the polyvinyl alcohol is present in amounts of at least 0.05%. At elevated temperatures, 130° to 140° F., the effect of polyvinyl alcohol in decreasing the water loss from the slurry becomes marked when the polyvinyl alcohol is present in amounts of at least 0.10% by weight of the dry cement, and even more marked when it is present in amounts of at least 0.15% on the same basis. Any of the slurries of test 2 to 11, inclusive, set out in the above table can be used with success in a squeeze cementing operation and will flow into and seal the smallest openings in the formation to be sealed, the particular amount of polyvinyl alcohol chosen to be added to the slurry depending, of course, on the conditions, such as temperature, encountered.

In the following Tables II, III, IV, and V there signed to test stirring or pumpability time of cement slurries at high temperatures. The device consists essentially of a rotating cylindrical container with an internal paddle assembly fixed to a head whose movement is independent of the container. With the container filled with cement slurry, the force against the paddle due to rotation of the container and the viscosity of the slurry is transferred from the head of the apparatus to pendulum lever arm by a suitable connection. The pendulum range is graduated from 0 to 10 divisions, representing slurry viscosities of 0 to 100 poises, a pull of 10 divisions on the pendulum being considered to represent the limit of pumpability of the slurry in an oil well. The temperature of the slurry during the test was maintained at the degree indicated by a thermostatically controlled bath surrounding the container. In the following tables stiffening time was taken as the time from initiation of the test in the consistometer until the indicator on the pendulum indicated a slurry viscosity of 100 poises.

TABLE II

*Water loss, stiffening time, and compressive strength of cements containing PVA and modified starch*

| | Additive, Per cent by Weight of Cement | Water Loss, 70°–80° F. | | | Stiffening Time at 200° F. | | Comp. Stg. in 24 Hr. at 140° F. |
|---|---|---|---|---|---|---|---|
| | | Ml. | Min. | Sec. | Hr. | Min. | |
| | | | | | | | P. s. i. |
| 1 | None | 184 | 2 | 10 | | 30 | 3,908 |
| 2 | 0.38 Modified Starch | 176 | 2 | 6 | 4 | 55 | 2,188 |
| 3 | 0.25 Type A PVA | 25 | 30 | 0 | | 32 | 3,594 |
| 4 | 1.00 Type A PVA | 11 | 30 | 0 | | 30 | 3,733 |
| 5 | 0.38 Modified Starch + 0.25 Type A PVA | 25 | 30 | 0 | 5 | 32 | 2,287 |
| 6 | 0.38 Modified Starch + 1.00 Type A PVA | 8 | 30 | 0 | 5 | 33 | 2,532 |

TABLE III

*Stiffening time and compressive strength of cements containing PVA and casein*

| | Additive, Per Cent by Weight of Cement | Stiffening Time at 200° F. | | Comp. Stg. in 24 Hr. at 140° F. |
|---|---|---|---|---|
| | | Hr. | Min. | |
| | | | | P. s. i. |
| 1 | 1.00 Casein | 3 | 55 | 3,388 |
| 2 | 1.00 Casein + 0.25 Type A PVA | 3 | 36 | 3,188 |
| 3 | 1.00 Casein + 1.00 Type A PVA | 4 | 50 | 2,969 |

TABLE IV

*Stiffening time and compressive strength of cements containing PVA and Weiler composition*

| | Additive, Per Cent by Weight of Cement | Stiffening Time at 200° F. | | Comp. Stg. in 24 Hr. at 140° F. |
|---|---|---|---|---|
| | | Hr. | Min. | |
| | | | | P. s. i. |
| 1 | 1.00 Weiler Composition | 3 | 27 | 2,976 |
| 2 | 1.00 Weiler Composition + 0.25 Type A PVA | 3 | 4 | 2,863 |
| 3 | 1.00 Weiler Composition + 1.00 Type A PVA | 3 | 12 | 3,051 |

It will be seen from an examination of Table II that the water loss of the specimen of test 2 containing 0.38% soluble starch alone was very high. With the addition of .25% PVA to such slurry, in test 5, the water loss was decreased to such low value that the slurry would seal small openings in porous formations. The stiffening times recorded show that the addition of polyvinyl alcohol within the indicated amounts does not adversely affect them, and in fact, appears to increase them. Furthermore, the compressive strength of structures resulting from such slurries after a set of 24 hours at 140° F. is on the whole, not markedly less than that of the neat slurry with neither polyvinyl alcohol nor modified starch, test 1, Table II. In all cases the strength is fully adequate to form a dense strong structure at a point where a broken porous formation is desired to be solidified.

As shown by Tables III and IV, the stiffening times at 200° F. of neat slurries containing casein and Weiler composition, respectively, remain practically unaffected by the addition of polyvinyl alcohol, and the same is true of the compressive strengths of the specimens resulting therefrom after a 24 hour set. Thus, the addition of retarding agents of the character, and within the ranges, set out above to cement containing polyvinyl alcohol within the ranges indicated produces cements which besides being low in water loss have a sufficiently long stiffening time at elevated temperatures to permit their being pumped down very deep wells. It should be noted, however, that the amounts of modified starch, casein, and Weiler composition given in Tables II, III, and IV are within the range which it is preferred to use. When the modified starch and the casein are used in smaller amounts with a cement of this composition, as for instance, 0.10% modified starch, and .40% casein, as indicated below in Table V, the stiffening times are appreciably shorter than those yielded by the specimens in Tables II and III. Furthermore, when a smaller amount of the Weiler composition, such as .30% employed in the specimens in Table V is used with a cement of this composition, the stiffening time is decreased and larger amounts of polyvinyl alcohol must be employed to cut down the loss of water. Thus, with slurries containing the Weiler composition and .25% polyvinyl alcohol the water loss is quite high whereas with slurries containing the Weiler composition and 1.00% polyvinyl alcohol and higher, the water loss is such that the slurry may be called a low-water-loss slurry.

TABLE V

*Water loss, stiffening time, and compressive strength of cements containing PVA and lower amounts of various retarders*

| | Additive, Per cent by Weight of Cement | Water Loss, 70°–80° F. | | | Stiffening Time at 200° F. | | Comp. Stg. in 24 Hr. at 140° F. |
|---|---|---|---|---|---|---|---|
| | | Ml. | Min. | Sec. | Hr. | Min. | |
| | | | | | | | P. s. i. |
| 1 | None | 184 | 2 | 10 | | 30 | 3,908 |
| 2 | 0.25 PVA | 25 | 30 | 0 | | 32 | 3,594 |
| 3 | 1.00 PVA | 8 | 30 | 0 | | 30 | 3,733 |
| 4 | 0.10 Modified Starch | 204 | 1 | 57 | | 44 | 2,532 |
| 5 | 0.10 Modified Starch+0.25 Type A PVA | 18 | 30 | 0 | | 44 | 2,480 |
| 6 | 0.10 Modified Starch+1.00 Type A PVA | 7.5 | 30 | 0 | | 47 | 2,391 |
| 7 | 0.40 Casein | 154 | 2 | 23 | 1 | 17 | 2,681 |
| 8 | 0.40 Casein+0.25 Type A PVA | 26 | 30 | 0 | 1 | 29 | 3,375 |
| 9 | 0.40 Casein+1.00 Type A PVA | 8 | 30 | 0 | 1 | 44 | 3,325 |
| 10 | 0.30 Weiler Composition | 165 | 2 | 2 | | 57 | 3,412 |
| 11 | 0.30 Weiler Composition+0.25 Type A PVA | 169 | 2 | 24 | | 56 | 3,287 |
| 12 | 0.30 Weiler Composition+1.00 Type A PVA | 75 | 30 | 0 | | 54 | 2,725 |
| 13 | 0.30 Weiler Composition+2.00 Type A PVA | 20 | 30 | 0 | | 55 | 2,812 |

The following Tables VI, VII, and VIII show the results of further tests conducted on slurries containing type A polyvinyl alcohol, type B polyvinyl alcohol, and typical mixtures of such two types within the scope of the present invention. The cement employed for these tests was also one falling within the A. S. T. M. designation C—150—44, type III. Such cement had an oxide anaylsis in per cent as follows:

*Oxide analysis, per cent*

| $SiO_2$ | $Al_2O_3$ | $Fe_2O_3$ | CaO | MgO | MnO | $SO_3$ | Loss on Ignition | Total |
|---|---|---|---|---|---|---|---|---|
| 20.8 | 5.9 | 2.4 | 65.4 | 0.92 | 0.13 | 2.3 | 1.4 | 99.25 |

The cement had a specific surface of 2570 cm.$^2$/g., (A. S. T. M. C—115—42) as measured by the Wagner turbidimeter.

The tests reported in the following tables were carried out in the same manner as those previously discussed, that is, water loss was determined in the Baroid wall-building tester, compressive strength was determined by compressing two-inch cubes, cured as noted, to destruction, and stiffening time was determined by use of the Halliburton consistometer operated as above specified.

The results in Table VIII below show that the addition of mixtures of the two types of polyvinyl alcohol within the specified limits does not adversely affect the compressive strength of the cement cured at elevated temperatures. These results further show that the addition of polyvinyl alcohol together with a retarder such as modified starch, which is ordinarily necessary at elevated temperatures to give adequate time for the cementing operations before the cement sets, does not unduly reduce the compressive strength of the cement.

TABLE VIII

*Stiffening time and compressive strength of cement containing PVA and soluble starch*

| | Water, Parts per 100 Parts Cement | Additive, Per Cent Weight of Cement | Stiffening Time at 200° F. | | Comp. Stg. in 24 hrs. at 200° F. |
|---|---|---|---|---|---|
| | | | Hr. | Min. | |
| 1 | 60 | None | | 31 | P. s. i. 2,751 |
| 8 | 60 | 0.25 Type A PVA+1.00 Type B PVA | | 28 | 2,958 |
| 11 | 60 | 0.38 Modified Starch | 4 | 43 | 2,367 |
| 12 | 60 | 0.25 Type A PVA+1.00 Type B PVA+0.38 Modified Starch | 5 | 16 | 2,031 |

The water loss results set out in Table VI strikingly show the behavior in this particular of cement slurries over the temperature range of from 70 to 200° F., when containing type A polyvinyl alcohol as an additive, when containing type B polyvinyl alcohol as an additive, and when containing a mixture of types A and B polyvinyl alcohol as an additive.

I have found that slurries employing as an additive mixtures of types A and B polyvinyl alcohol typified by the compositions of specimens 8, 9, and 10, Tables VI and VII are to be preferred for their water retention properties over wide temperature ranges, as indicated. A retarder will ordinarily be added to such composition, particularly for high temperature work, the total

TABLE VI

*Water loss of cements containing PVA*

| | Water, Parts per 100 Parts Cement | PVA, Per Cent Weight of Cement | Water Loss at Temperatures Indicated | | | | | | | | |
|---|---|---|---|---|---|---|---|---|---|---|---|
| | | | 70–80° F. | | | 130–140° F. | | | 190–200° F. | | |
| | | | Ml. | Min. | Sec. | Ml. | Min. | Sec. | Ml. | Min. | Sec. |
| 1 | 60 | None | 184 | 2 | 20 | 174 | 1 | 12 | 162 | 0 | 48 |
| 2 | 60 | 0.25 Type A | 32 | 30 | 0 | 58.5 | 30 | 0 | 164 | 1 | 3 |
| 3 | 60 | 1.00 Type A | 11.5 | 30 | 0 | 13.5 | 30 | 0 | 103 | 1 | 44 |
| 4 | 60 | 3.00 Type A | 4.5 | 30 | 0 | 4 | 30 | 0 | 39 | 30 | 0 |
| 5 | 60 | 0.25 Type B | 176 | 2 | 35 | 151 | 1 | 37 | 157 | 1 | 13 |
| 6 | 60 | 1.00 Type B | 98 | 30 | 0 | 113.5 | 30 | 0 | 36.5 | 30 | 0 |
| 7 | 60 | 3.00 Type B | 31 | 30 | 0 | 91 | 30 | 0 | 6.5 | 30 | 0 |
| 8 | 60 | 0.25 Type A+1.00 Type B | 17.5 | 30 | 0 | 50 | 30 | 0 | 27 | 30 | 0 |
| 9 | 60 | 0.25 Type A+1.50 Type B | 14.0 | 30 | 0 | 41.5 | 30 | 0 | 20 | 30 | 0 |
| 10 | 60 | 0.25 Type A+2.00 Type B | 12.5 | 30 | 0 | 30 | 30 | 0 | 12.5 | 30 | 0 |

Table VII gives the compressive strengths of cements when cured a period of 24 hours at the indicated temperature. The specimens in this table have, as will be noted, the same composition as the correspondingly numbered specimens in Table VI.

slurry composition for such purpose being typified by the composition of specimen 12, Table VIII.

Whereas I have disclosed preferred compositions of the cement, cement slurries, and methods of making them, it is to be understood that the

TABLE VII

*Compressive strength of cements containing PVA*

| | Water, Parts per 100 Parts Cement | PVA, Per Cent Weight of Cement | Compressive Strength in 24 Hours, p. s. i. | | |
|---|---|---|---|---|---|
| | | | 70–80° F. | 130–140° F. | 190–200° F. |
| 1 | 60 | None | 789 | 3,421 | 2,751 |
| 2 | 60 | 0.25 Type A | 824 | 3,675 | 2,725 |
| 3 | 60 | 1.00 Type A | 729 | 3,877 | 2,983 |
| 4 | 60 | 3.00 Type A | 804 | 2,846 | 2,078 |
| 5 | 60 | 0.25 Type B | 840 | 3,404 | 3,133 |
| 6 | 60 | 1.00 Type B | 858 | 3,040 | 2,775 |
| 7 | 60 | 3.00 Type B | 716 | 2,600 | 2,325 |
| 8 | 60 | 0.25 Type A+1.00 Type B | 781 | 3,108 | 2,958 |
| 9 | 60 | 0.25 Type A+1.50 Type B | 798 | 3,050 | 2,962 |
| 10 | 60 | 0.25 Type A+2.00 Type B | 728 | 2,819 | 2,816 | invention is capable of considerable variation as to details. I, therefore, claim as new the following:

1. A cement composition comprising Portland cement having mixed therewith from .025 to 5.0% of polyvinyl alcohol by weight of cement and from .02 to .05% by weight of cement of a foam-suppressing agent selected from the group consisting of tributyl phosphate and pine oil, said composition forming a slurry substantially free from entrained air when mixed with water.

2. A cement composition comprising Portland cement having mixed therewith from .025 to 1.0% of polyvinyl alcohol by weight of cement and from .02 to .05% by weight of cement of a foam-suppressing agent selected from the group consisting of tributyl phosphate and pine oil, said composition forming a slurry substantially free from entrained air when mixed with water.

3. A composition as defined by claim 1 characterized by said polyvinyl alcohol including from 0.10 to 0.50% by weight of the cement of polyvinyl alcohol resulting from 50 to 88% hydrolysis of vinyl acetate, and from 0.75 to 2.25% by weight of the cement of polyvinyl alcohol resulting from substantially complete hydrolysis of vinyl acetate.

4. A slurry comprising a mixture with water of Portland cement, from .025 to 5.0% polyvinyl alcohol by weight of cement and from .02 to .05% by weight of cement of a foam-suppressing agent selected from the group consisting of tributyl phosphate and pine oil, said slurry being substantially free from entrained air.

5. A slurry as defined by claim 4, characterized by said polyvinyl alcohol including from 0.10 to 0.50% by weight of the cement of polyvinyl alcohol resulting from 50 to 88% hydrolysis of vinyl acetate, and from 0.75 to 2.25% by weight of the cement of polyvinyl alcohol resulting from substantially complete hydrolysis of vinyl acetate.

6. A cement composition comprising Portland cement having mixed therewith from .025 to 5.0% of polyvinyl alcohol by weight of cement and from .02 to .05% by weight of cement of an agent effective to suppress the foaming tendency of polyvinyl alcohol in a cement-water mixture, whereby the slurry resulting from mixing said composition with water is substantially free from entrained air.

7. In a method of making a cement slurry having a low water loss and substantially free from entrained air and therefore adapted for cementing walls, the steps including mixing with Portland cement from .025 to 5.0% by weight of polyvinyl alcohol and from .02 to .05% by weight of an agent effective to suppress the foaming tendency of polyvinyl alcohol in a cement-water mixture, and adding sufficient water to the thus modified cement to form a fluid paste thereof.

8. A cement composition comprising a Portland cement as the major component, from .025 to 5% of polyvinyl alcohol by weight of cement and a minor proportion of an agent effective to suppress the foam-stabilizing characteristic of polyvinyl alcohol in a cement-water mixture.

NORMAN C. LUDWIG.

REFERENCES CITED

The following references are of record in the file of this patent:

UNITED STATES PATENTS

| Number | Name | Date |
|---|---|---|
| 2,351,109 | Corwin et al. | June 13, 1944 |
| 2,374,628 | Swayze | April 24, 1945 |
| 2,384,611 | Douthett | Sept. 11, 1945 |